United States Patent
Kaufmann et al.

(10) Patent No.: US 10,604,127 B2
(45) Date of Patent: Mar. 31, 2020

(54) METHOD FOR CONTROLLING A BRAKE SYSTEM

(71) Applicant: Continental Teves AG & Co. oHG, Frankfurt (DE)

(72) Inventors: Tom Kaufmann, Ippenschied (DE); Peter Stauder, Mainz (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 83 days.

(21) Appl. No.: 15/357,612

(22) Filed: Nov. 21, 2016

(65) Prior Publication Data

US 2017/0072924 A1   Mar. 16, 2017

Related U.S. Application Data

(63) Continuation of application No. PCT/EP2014/060438, filed on May 21, 2014.

(51) Int. Cl.
*B60T 8/32* (2006.01)
*B60T 8/40* (2006.01)
(Continued)

(52) U.S. Cl.
CPC ............ *B60T 8/326* (2013.01); *B60L 7/24* (2013.01); *B60T 8/4081* (2013.01);
(Continued)

(58) Field of Classification Search
CPC .... B60T 8/326; B60T 8/4081; B60T 2270/82; B60T 2220/04; B60L 7/24; Y02T 10/643; H02P 21/0089
(Continued)

(56) References Cited

U.S. PATENT DOCUMENTS 5,345,154 A * 9/1994 King ............... B60K 6/46 318/49
5,363,032 A * 11/1994 Hanson ............... F02N 11/04 318/701

(Continued)

FOREIGN PATENT DOCUMENTS

CN   101764553 A   6/2010
CN   102481914 A   5/2012
(Continued)

OTHER PUBLICATIONS

Machine Translation in English for EP 2015442 A2; Inventor: Hexamer; 28 pages; Retrieve Date: Feb. 11, 2018.*
(Continued)

*Primary Examiner* — Vishal R Sahni

(57) ABSTRACT

A brake system comprises a cylinder-piston unit movable by an electromechanical actuator. Wheel brakes associated with at least one axle can be supplied with braking pressure via the hydraulic pressure chamber. The electromechanical actuator comprises a rotation-translation transmission and an electronically commutated synchronous machine having a stator with at least two phase windings, a rotor comprising at least one permanent magnet and at least one rotor position sensor. A torque-forming current and/or a magnetic field attenuating current are adjusted in a co-ordinate system which is fixed relative to the rotor. Voltages in the co-ordinate system are detected to serve as control variables and are transformed into a voltage phasor, which indicates for each phase winding of the stator, a voltage to be applied, and a set value for the magnetic field attenuating current is limited to a maximum value being determined from a predetermined characteristic map.

20 Claims, 4 Drawing Sheets

(51) Int. Cl.
*H02P 21/00* (2016.01)
*B60L 7/24* (2006.01)

(52) U.S. Cl.
CPC ....... *H02P 21/0089* (2013.01); *B60T 2220/04* (2013.01); *B60T 2270/82* (2013.01); *Y02T 10/643* (2013.01)

(58) Field of Classification Search
USPC .......................................................... 303/20
See application file for complete search history.

(56) References Cited

U.S. PATENT DOCUMENTS

| | | | | |
|---|---|---|---|---|
| 6,118,247 | A * | 9/2000 | Obayashi | B60L 11/12 318/705 |
| 6,163,128 | A * | 12/2000 | Hiti | B60L 11/1803 318/433 |
| 6,194,865 | B1 | 2/2001 | Mitsui et al. | |
| 6,550,871 | B1 * | 4/2003 | Bohm | B60T 8/3255 188/156 |
| 9,315,180 | B2 * | 4/2016 | Jungbecker | B60T 8/4081 |
| 2006/0284582 | A1 * | 12/2006 | Jeong | B60L 11/1803 318/432 |
| 2009/0284195 | A1 * | 11/2009 | Gallegos-Lopez | B60L 15/025 318/400.02 |
| 2010/0109584 | A1 * | 5/2010 | Kwon | H02P 21/0089 318/400.02 |
| 2010/0308759 | A1 * | 12/2010 | Hohn | B60L 11/1803 318/400.09 |
| 2011/0162554 | A1 * | 7/2011 | Galic | H02P 21/0089 105/49 |
| 2015/0375726 | A1 * | 12/2015 | Roll | B60T 8/4081 303/3 |

FOREIGN PATENT DOCUMENTS

| | | | |
|---|---|---|---|
| DE | 102010040097 A1 | 3/2011 | |
| EP | 0638457 A2 | 2/1995 | |
| EP | 2015442 A2 * | 1/2009 | .......... H02P 21/0089 |
| EP | 2015442 A2 | 1/2009 | |

OTHER PUBLICATIONS

International Search Report and Written Opinion dated Jun. 10, 2015 from corresponding International Patent Application No. PCT/EP2014/060438.

China Office Action dated Apr. 5, 2018 for corresponding Chinese Patent Application No. 201480078978.8.

* cited by examiner

METHOD FOR CONTROLLING A BRAKE SYSTEM

CROSS REFERENCE TO RELATED APPLICATIONS

This U.S. patent application claims the benefit of PCT patent application No. PCT/EP2014/060438, filed Mar. 21, 2014, which is hereby incorporated by reference.

TECHNICAL FIELD

The invention concerns an electronic control unit ] as well as a brake system for a motor vehcile.

BACKGROUND

A method and a system for actuating a brake of a vehicle that can be electromechanically operated by means of an actuator that consists of an electric motor and a gearbox connected downstream of the electric motor are known from EP 1 154 922 B1, wherein the electric motor comprises a design-related revolution rate-torque characteristic curve, wherein the gradient of the revolution rate-torque characteristic curve of the electric motor is altered according to the desired operating force as well as the gradient of the operating force by reducing components of the electromagnetic field of the electric motor so that a higher revolution rate is achieved for the same torque. With the brake described, the frictional lining is fed against the brake disk electromechanically.

A generic hydraulic brake system is described in DE 10 2010 040 097 A1. In this case, a hydraulic cylinder-piston arrangement is used as a pressure source, in which a piston is driven by an electric motor with the interposition of a rotation-translation gearbox. The pressure source is connected to wheel brakes by means of hydraulic lines and inserted hydraulic valves.

Electronically commutated permanently energized synchronous machines, also known as brushless motors, comprise a stator with at least two, in particular three, phase windings and a rotor with at least one pole pair that is disposed perpendicular to the axis of rotation and that is formed by one or more permanent magnets disposed in or on the rotor. If one or more phase windings is energized, the rotor aligns itself in the existing magnetic field. For a specific actuation, the rotor position must be determined, which is carried out for example by means of a resolver or rotary encoder.

The regulation of the phase currents is often carried out in a coordinate system that is fixed relative to the rotor, wherein a d-axis in the direction of the rotor magnet field and a q-axis at an angle of 90° thereto (electrical angle, combined with the mechanical angle by means of the pole-pair number) are considered. A current flowing in the q-axis direction determines the delivered torque (in a motor without a reluctance torque) and is therefore referred to as a torque-forming current (iq). Below a revolution rate limit, the field attenuation current (id) flowing in the d-axis direction is kept at zero to maximize efficiency. The coordinate system that is fixed relative to the rotor rotates in the opposite direction to the stator, therefore the phase currents or voltages to be applied are determined by means of a suitable transformation using the rotor position.

With increasing revolution rate, an ever larger counter voltage is induced in the phase windings, so that the achievable revolution rate is limited by the available supply voltage. There is therefore a natural voltage limit for the revolution rate, which is achieved when energizing the phase windings exclusively with a torque-forming current at full actuation, i.e. without reducing the voltage by means of pulse width modulation. By applying a suitable current in the direction of the negative d-axis, i.e. in a field attenuation mode, higher revolution rates can be achieved.

A device for operating a synchronous machine with a stator with which three winding phases are associated and a rotor is known from DE 102007033145 A1. The device is designed to determine a target value of a magnet field-forming current in a coordinate system rotating with the rotor of the synchronous machine depending on a magnet field-forming raw target current component of the coordinate system circulating with the rotor and a magnet field-forming current limit of the coordinate system circulating with the rotor, and to do so such that the target value of the magnetic field-forming current is limited to the magnetic field-forming current limit, wherein the magnitude of the magnetic field-forming current limit lies below a typical tip-over limit for the synchronous machine in the field attenuation mode. Furthermore, the device is designed to reduce the magnitude of a torque-forming current limit of the coordinate system circulating with the rotor in the region of the limit of the magnet field-forming current depending on the magnet field-forming raw target current component and the magnet field-forming current limit.

A field attenuation regulator of this type enables a voltage reserve to be held at all working points of the motor for imposing new target current values. However, holding a voltage reserve always has the effect of always imposing a larger field attenuation current id than is necessary for reaching the working point. This increases the Ohmic losses of the motor and thus degrades the efficiency of the drive. It is moreover a disadvantage that the field attenuation regulator requires a certain time to adjust the necessary magnetic field attenuation current, which results in extending the control time for dynamically position-regulated systems.

For example, in automobile applications electric motors are operated up to 1 kW from a low supply voltage (for example 12V), so that the Ohmic resistance of the phase windings relative to the inductive reactance can no longer be neglected. In general, instabilities in the regulation or actuation of the motor can occur at high revolution rates of the rotor by an interaction between magnetic field attenuation and torque-forming currents.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for actuating a brake system comprises a cylinder-piston arrangement driven by an electronically commutated synchronous machine, wherein a more dynamic build-up of pressure is also to be carried out reliably.

Thus a method is provided for operating a brake system for motor vehicles with an electrically controllable pressure supply device that comprises a cylinder-piston arrangement with a hydraulic pressure chamber and a piston that can be displaced by an electromechanical actuator, with a number of hydraulic wheel brakes associated with at least one axle of the vehicle and that can be supplied with brake pressure by means of the hydraulic pressure chamber, and with a sensor for detecting the driver's braking intention, wherein the electromechanical actuator comprises a rotation-translation gearbox and an electrical machine. According to the invention, the electrical machine is implemented as an electronically commutated synchronous machine comprising a stator with at least two, in particular three, phase windings, a rotor comprising at least one permanent magnet as well as at least one rotor position sensor.

A torque-forming current (iq) and/or a magnetic field attenuation current (id) are regulated in a coordinate system that is fixed relative to the rotor, wherein voltages in the coordinate system that is fixed relative to the rotor are determined as control variables, which are transformed using the measured rotor position into a voltage vector that specifies a voltage to be applied for each phase winding of the stator. A target value for the magnetic field attenuation current (id) is limited to a maximum value, which is preferably determined from a predetermined characteristic field, according to the measured revolution rate of the rotor. It is advantageous if the magnetic field attenuation current is set to or regulated to zero below a predetermined minimum revolution rate.

Because the imposed magnet field attenuation current (or the target value thereof) is limited, regulation instabilities occurring at high revolution rates of the rotor can be prevented. A measured revolution rate can be determined using the information of the rotor position sensor(s) that is/are required in any case. By carrying out the limiting of the magnetic field attenuation current according to the measured revolution rate, unstable operation of the motor can be prevented simply and rapidly. Reliable actuation of the brushless electric motor at high revolution rates or in highly dynamic states can thus be guaranteed. If a characteristic field is predetermined, then the maximum value for the magnetic field attenuation current can be simply read out. A reliable and rapid pressure build-up when required is guaranteed.

The target value for the magnetic field attenuation current is furthermore preferably limited so that it does not fall below a minimum value predetermined according to the measured revolution rate. This speeds up reaching the optimum by the field attenuation regulator.

According to a preferred embodiment of the invention, a target value for the magnetic field attenuation current is determined according to the measured revolution rate of the rotor from a first predetermined characteristic field. Because a target value for the magnetic field attenuation current is determined using a characteristic curve, the actuation according to said embodiment of the invention has a particularly simple structure. A corresponding method can therefore also be implemented with processors of low computing power. Further, there is no delay in the application of the magnetic field attenuation current by the field attenuation regulator, whereby a particularly high control rate can thus be achieved.

In this case, it is advantageous if the target value of the magnetic field attenuation current is adjusted or scaled using the ratio between a reference voltage and a current supply voltage. The current supply voltage can for example be received from an external control unit or measured as an intermediate circuit voltage in a pulse width modulation circuit connected to a phase winding of the stator. This enables uniform behavior of the motor to be maintained, even in the presence of fluctuations in the supply voltage.

According to another preferred embodiment of the invention, a target value for the torque-forming current is limited to a maximum value of the torque-forming current according to the measured revolution rate of the rotor. This reduces the computing costs of carrying out the method and enables flexible adaptation of the motor behavior to the desired application.

In particular, the target value for the magnetic field attenuation current and the maximum value of the torque-forming current can be predetermined so that a predetermined limit value for a total current of the magnetic field attenuation current and the torque-forming current is not exceeded and so that the torque of the electronically commutated synchronous machine is at a maximum while complying with the limit value for the total current. This can be carried out both in the generator mode and also in the motor mode of the electronically commutated synchronous machine. The input direct current or feedback current is then limited so that excessive heating of or damage to the battery and/or THE charging electronics or actuation electronics is avoided.

According to an alternate embodiment of the invention, the limiting is carried out after the target value for the magnetic field attenuation current (id) has been determined according to a difference between the magnitude of a predetermined maximum voltage and the magnitude of a voltage vector formed from the torque-forming voltage and the magnetic field attenuation voltage, wherein in particular the regulation of said difference is carried out. The predetermined maximum voltage can in particular correspond to a current supply voltage minus a predetermined voltage interval, preferably a measured intermediate circuit voltage of a pulse width modulation circuit connected to a phase winding of the stator. Field attenuation regulation can thus be carried out while taking into account the currently available voltage.

According to a preferred embodiment of the invention, regulation of the difference between the magnitude of a predetermined maximum voltage and the magnitude of a voltage vector formed from the torque-forming voltage and the magnetic field attenuation voltage takes place if the magnitude of the voltage vector is less than a predetermined minimum value. In this case, it is advantageous if precontrol of the target value for the magnetic field attenuation current is carried out, in particular by predetermining the maximum permissible field-attenuation current. This enables the achieved dynamic level of actuation of the motor to be increased. It is particularly advantageous if the regulator reduces the magnetic field attenuation current to the currently required value. Unnecessary electrical heat losses are avoided thereby.

Advantageously, a target value for the torque-forming current (iq) is determined according to a deviation between a target revolution rate and the measured revolution rate of the rotor, wherein the target value for the torque-forming current is limited to a maximum value according to a target value for the magnetic field attenuation current and/or to a maximum permissible total current and/or to a maximum permissible motor torque.

It is advantageous if the regulation of the torque-forming current is carried out so that a torque-forming voltage is determined in the coordinate system that is fixed relative to the rotor according to the difference between a target value for the torque-forming current and a measured torque-forming current, wherein the torque-forming voltage is preferably limited according to a difference between the magnitude of a predetermined maximum voltage, in particular a supply voltage, and the magnitude of a magnetic field attenuation voltage.

The regulation of the magnetic field attenuation current is preferably carried out so that a magnetic field attenuation voltage in the coordinate system that is fixed relative to the rotor is determined according to the difference between a target value for the magnetic field attenuation current and a measured magnetic field attenuation current.

A measured torque-forming current and a measured magnet field attenuation current are preferably determined in a coordinate system that is fixed relative to the rotor from measured currents through the phase windings of the rotor using the measured rotor position.

Advantageously, the target value for the magnetic field attenuation current is furthermore limited or adjusted using a measured rotor temperature and/or a measured stator temperature and/or a current supply voltage. The current supply voltage can be measured at a predetermined point of the circuit, for example.

It is advantageous if the phase windings of the stator are each supplied with current by means of a pulse width modulation circuit, wherein a voltage to be applied to a phase winding of the stator is converted into a degree of actuation of the corresponding pulse width modulation circuit. The degree of actuation of a pulse width modulation determines the ratio between the time during which the maximum voltage is applied and the time during which no voltage is applied in a cyclically repeating period. Such pulse width modulation circuits are widely used and inexpensive because of the simple design and high efficiency thereof.

It is advantageous if the degree of actuation is adjusted or scaled according to a ratio of a reference voltage and a current supply voltage, in particular a measured intermediate circuit voltage of the pulse width modulation circuit. Steady behavior of the electronically commutated synchronous machine is guaranteed thereby.

The invention further concerns an electronic control unit for a brake system, comprising an actuation circuit for an electronically commutated synchronous machine, with a computation unit and semiconducting switch elements disposed in at least one bridge circuit, in particular pulse width modulation circuits each associated with a phase of the stator, wherein the computation unit carries out a method according to the invention, wherein the maximum value of the magnetic field attenuation current is determined using pairs of values of measured revolution rates and associated maximum values read out from a non-volatile memory.

A brake system for motor vehicles with an electrically controlled pressure supply device that comprises a cylinder-piston arrangement with a hydraulic pressure chamber and a piston that can be displaced by an electromechanical actuator, with a number of hydraulic wheel brakes that are associated with at least one axle of the vehicle and that can be supplied with brake pressure by means of the hydraulic pressure chamber, and with a sensor for detecting the driver's braking intention, wherein the electromechanical actuator comprises a rotation-translation gearbox and an electronically commutated synchronous machine that comprises a stator with at least two, in particular three, phase windings, a rotor comprising at least one permanent magnet as well as at least one rotor position sensor that comprises such an electronic control unit.

Advantageously, the brake system comprises an electrical drive connected to at least one wheel of the vehicle, which is actuated at least at times so as to produce braking deceleration of the vehicle and which can preferably be used for energy recovery.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Regarding the hydraulic design of the brake system, refer to DE 10 2010 040 097 A1, which is incorporated herein by reference.

The actuation according is particularly suitable for actuating permanently energized synchronous machines with limited inductance that are to be operated in a wide range of revolution rates with high output power. The actuation of brushless motors with equal inductances in the directions of the d-axis and the q-axis is described below; in principle, however, motors with a reluctance torque can also be actuated according to a method according to the invention.

According to a particularly preferred embodiment, the imposed magnetic field attenuation current id is not set by a regulator, but is predetermined so that the maximum possible motor torque can be output at a determined revolution rate. Said type of actuation makes use of the fact that different driven actuators, in particular in brake systems, primarily operate at the voltage and current limits of the drive. If the actuator is within the target range of the higher level system, i.e. for example almost at the target position, then the requested revolution rate is low and the working points of the drive lie at the current limit, so that no magnetic field attenuation current is necessary there. If the higher level system requests a changed rotor position (not necessarily because of position regulation), then said changed rotor position should often be approached in the shortest possible time, whereby the working points that are passed through lie at the voltage limit.

Figure 1:
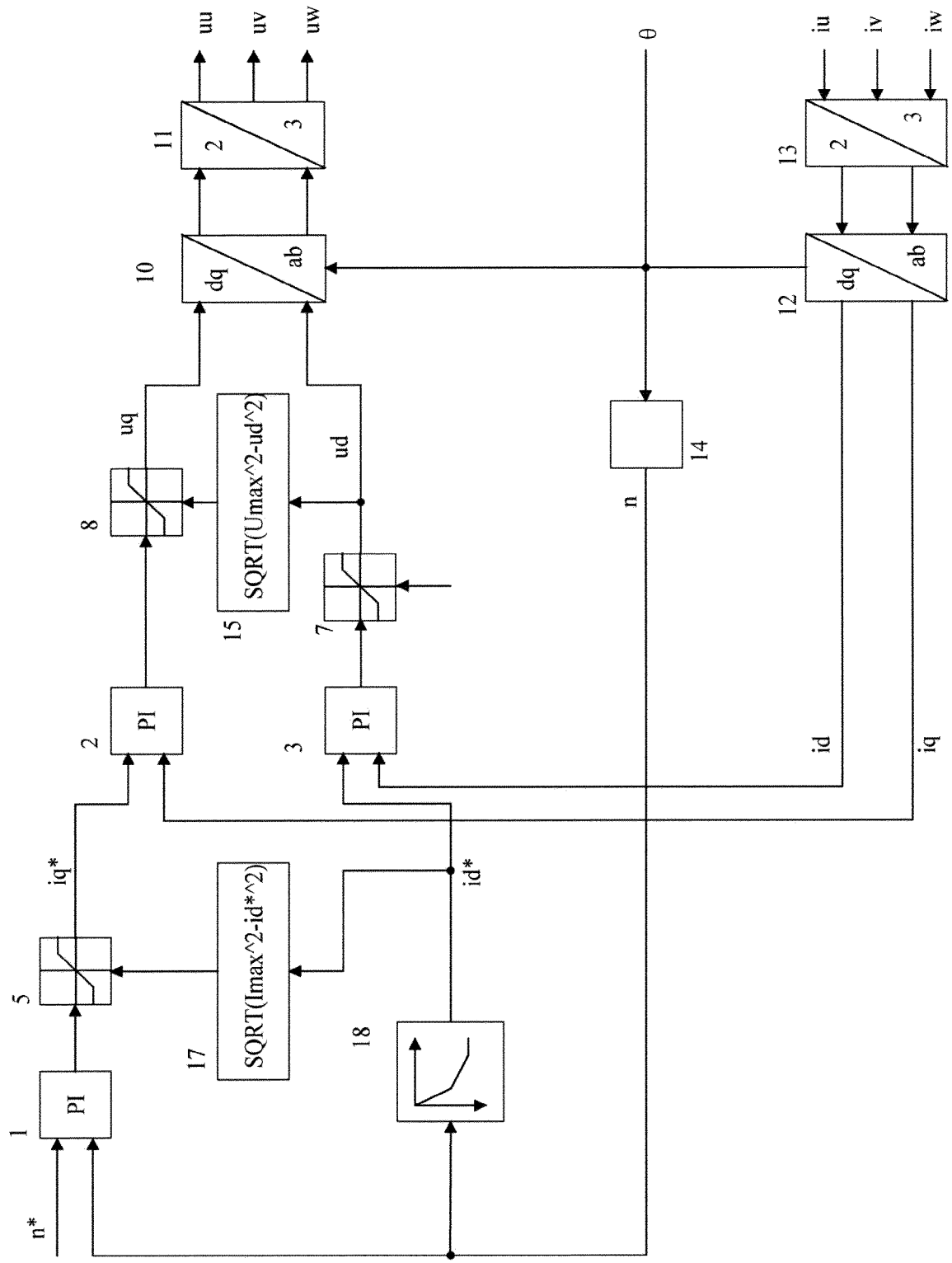
FIG. 1 shows a schematic representation of an actuation method or an actuation circuit according to a first exemplary embodiment of the invention.

The actuation method according to a first exemplary embodiment that is shown schematically in FIG. 1 therefore provides that target values id* for the magnetic field attenuation current are predetermined according to the measured revolution rate. This can be carried out advantageously by analyzing a characteristic field that describes the profile of the optimum magnetic field attenuation current at which the maximum power and/or the maximum torque is/are output against the revolution rate. The determination of the characteristic field can be carried out based on simulations and calculations using the motor parameters. Alternatively or additionally, the characteristic field can also be determined experimentally by increasing the component of the magnetic field attenuation current stepwise at different fixed revolution rates for the requested maximum phase current until the maximum output motor torque is reached. It is particularly advantageous if a characteristic field is calculated first and then confirmed by measurements.

A target revolution rate n* is predetermined by a control unit of the overall system and is compared in the revolution rate regulator 1 with a measured motor revolution rate or a rotor revolution rate n in order to generate a control variable that corresponds to the requested torque-forming current iq*. The revolution rate regulator can in particular be implemented as a PI regulator, i.e. comprising a proportional component and an integral component.

The iq current limiter 5 that is connected downstream limits the target current value iq* so that, depending on the current target value id* for the magnetic field attenuation current, the magnitude of the total current vector $i_{total}$ does not exceed a predetermined maximum value, wherein said magnitude can be calculated according to the following relationship:

$$i_{total} = \sqrt{iq^2 + id^2}$$

The respective maximum value $iq_{max}$ for the torque-forming current is determined by module 17, for example using the relationship:

$$iq_{max} = \sqrt{i_{max}^2 - i_{d*}^2}$$

In addition, further limiting of the target current value iq* is carried out so that the maximum permissible motor torque is not exceeded:

$$iq_{max} = \frac{M_{max}}{k_r}$$

Alternatively, it can also be provided that the maximum value $iq_{max}$ for the torque-forming current is determined by reading out a characteristic field according to the revolution rate.

This is particularly advantageous because in module 18 the target value id* for the magnetic field attenuation current in said exemplary embodiment is determined from a characteristic field according to the revolution rate, and thus only a small amount of computing power is necessary for carrying out the method.

The on-board electrical wiring of a vehicle can have varying supply voltages depending on the condition of the vehicle and the state of charge of the battery. If the actuated motor exhibits uniform behavior regardless of the current supply voltage, then it is advantageous to prescribe the characteristic curve for a predetermined reference voltage, in particular a minimum permissible value for the supply voltage, and when determining a target value id* for the magnetic field attenuation current to carry out scaling according to the ratio of the reference voltage and the current or measured supply voltage.

If both the target value id* for the magnetic field attenuation current and the maximum value $iq_{max}$ for the torque-forming current are determined according to the revolution rate using a characteristic field, then the characteristic of the motor can be adapted according to the envisaged application by predetermining suitable characteristic fields.

If an application requests that a certain input direct current is not exceeded in the motor mode, the values of id* and $iq_{max}$ can be predetermined according to the revolution rate so that the output motor torque is at a maximum while complying with the limit for the input direct current.

If an application requests that a certain feedback current is not exceeded in the generator mode, the values of id* and $iq_{max}$ can be predetermined according to the revolution rate of so that the output motor braking torque is at a maximum while complying with the limit for the feedback current.

If an application requests that the received maximum input direct current is reduced at supply voltages that are less than the rated voltage range or the reference voltage, then this can be achieved by reducing the maximum value $iq_{max}$ as a function of the measured or available supply voltage.

Depending on the application, in addition the magnet temperature and the winding temperature can be taken into account when determining the values of id* and $iq_{max}$.

The determined target value id* is fed to the current regulator 3, which determines a target magnetic field attenuation voltage ud in the direction of the d-axis using the comparison of id* with the measured magnet field attenuation current id. It is advantageous if the current regulator 2 is implemented as a PI regulator, i.e. has a proportional component and an integral component.

The target magnetic field attenuation voltage du may correspond to the maximum of the available voltage Umax in the intermediate circuit or to the supply voltage and is therefore limited to a corresponding value in the limiter 7.

The current regulator 2 for the torque-forming current compares the target current value iq* with a current measured torque-forming current iq and generates a control variable that corresponds to the target voltage uq in the direction of the q-axis. Advantageously, the current regulator 2 can be implemented as a PI regulator, i.e. with a proportional component and an integral component.

The target torque-forming voltage is fed to a limiter 8 that prevents the magnitude utotal of the total voltage vector of the torque-forming voltage and the magnetic field attenuation voltage from exceeding the maximum available voltage Umax:

$$u_{total} = \sqrt{uq^2 + ud^2}$$

The maximum value $uq_{max}$ for the torque-forming voltage is advantageously determined in module 15 using the following relationship:

$$uq_{max} = \sqrt{U_{max}^2 - u_d^2}$$

Alternatively, it can also be provided to read out the maximum value for the limiter 8 from a characteristic field.

The target values for the torque-forming voltage uq and for the magnetic field attenuation voltage ud, i.e. the voltage vector in the coordinate system that is fixed relative to the rotor, are transformed into the coordinate system that is fixed relative to the stator in module 10 using the measured rotor position and are converted in module 11 into a voltage vector that gives the voltages uu, uv, uw that are to be applied to the individual phase windings. This can be carried out with a suitable transformation, such as the inverse Clarke and Park transformation; methods for such a coordinate transformation are known.

The phase windings of the stator are energized by means of a bridge circuit consisting of power semiconductors, wherein advantageously a pulse width modulation takes place. The semiconducting switches can for example be in the form of sense FETs in order to enable the measurement of the current flowing through the phase windings. Alternatively, direct measurement by means of a shunt or an inductive current sensor is also possible. The currents obtained iu, iv, iw are converted in module 13 in the coordinate system that is fixed relative to the stator and are transformed into the coordinate system that is fixed relative to the rotor in module 12 using the measured rotor position (or alternatively are transformed in one step).

Advantageously, for measurement of the rotor position a resolver is used, from the signals of which an (electrical) rotor angle θ can be determined. Said rotor angle is fed to module 14, which determines a motor revolution rate or a rotor revolution rate (in particular from a change of the signals).

Owing to the fact that a target value for the magnetic field attenuation current is determined using a characteristic curve, the actuation according to this implementation of the invention comprises a quite particularly simple structure.

Figure 2:
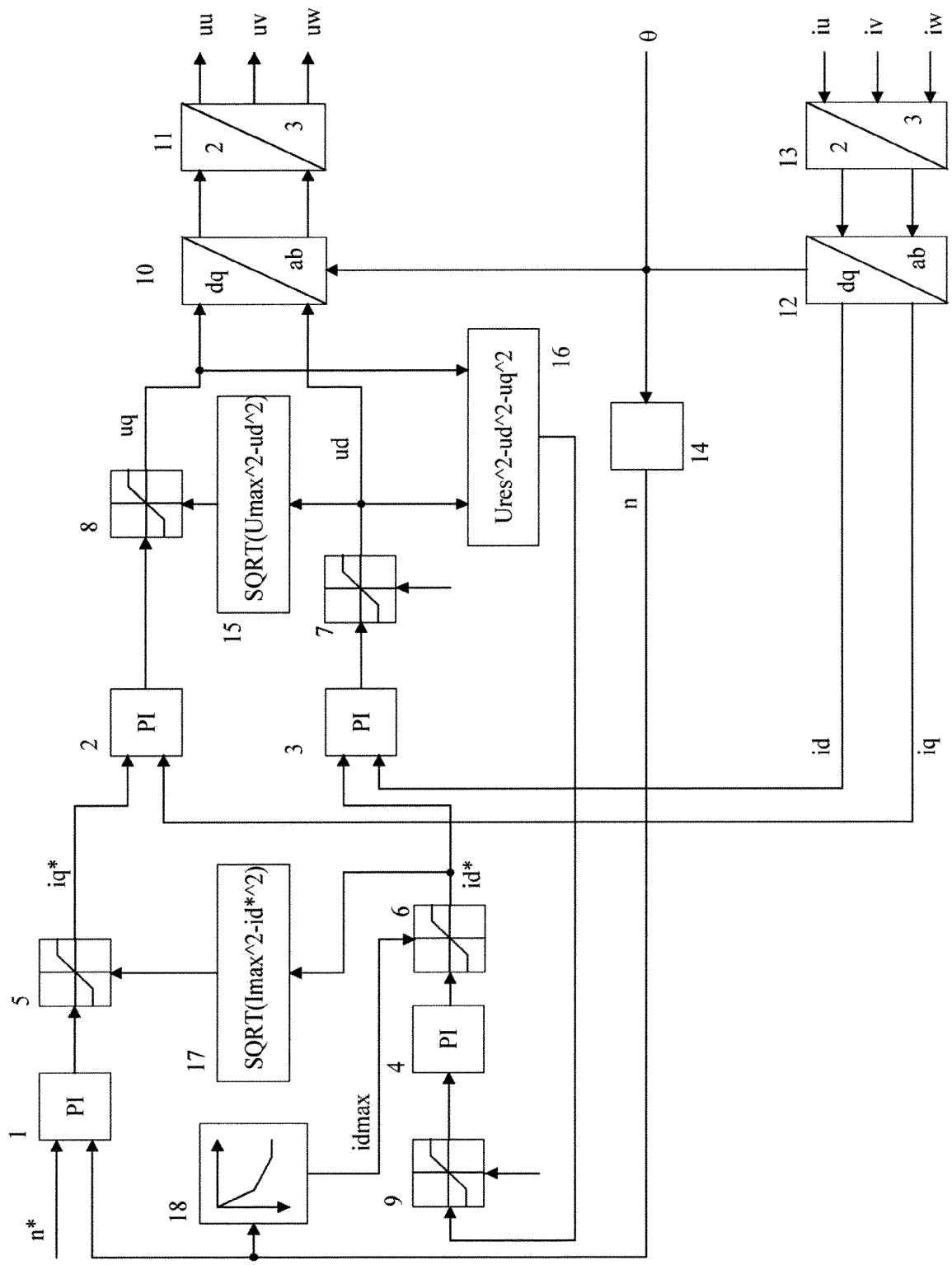
FIG. 2 shows a schematic representation of an actuation method or an actuation circuit according to a second exemplary embodiment of the invention.

According to an alternative exemplary embodiment, which is represented in FIG. 2, the magnetic field attenuation current is also regulated, wherein the target value id* for the magnetic field attenuation current is limited according to the measured revolution rate. Modules that provide an identical function in this embodiment as in the first exemplary embodiment are provided with the same reference characters, and for a detailed description we refer to the above implementations.

Revolution rate regulator 1 compares the target revolution rate n* and the current rotor revolution rate n and generates a target value iq* for the torque-forming current as a control variable. The limiter 5 that is connected downstream limits the target current value iq* so that, depending on the current target value of the current id*, the permissible magnitude of the total current vector is not exceeded. For this purpose, a maximum value $iq_{max}$ is determined in module 17 by calculation or by reading out from a characteristic field and is provided to the limiter. Current regulator 2 compares the target current value iq* and the currently existing torque-forming current iq and specifies a target voltage uq, which is limited in the limiter 8 that is connected downstream using the supply voltage and the target magnetic field-forming voltage du. In this case, in module 15 the maximum value is predetermined so that the magnitude of the voltage vector does not exceed the available supply voltage.

The voltage vector of the torque-forming voltage and the magnetic field attenuation voltage that is determined in the coordinate system that is fixed relative to the rotor is subjected in modules 10 and 11 (or a combined module) to a suitable transformation, such as an inverse Clarke and Park transformation, in order to obtain the voltage vector of the voltages to be applied to the individual phase windings.

Furthermore, the torque-forming voltage uq and the magnetic field attenuation voltage ud are fed to a module 16 for voltage monitoring, which determines the separation of the voltage vector from a voltage limit Ures, or subtracts the square of the voltage vector from the square of the voltage limit (the square root may then be formed). The voltage limit is advantageously smaller than the available voltage Umax by a predetermined voltage difference, so that a voltage reserve is reserved for imposing new target current values.

$$\Delta = Ures^2 - ud^2 - uq^2$$

The determined difference Δ can be limited in limiter 9 to values lying in a predetermined interval before it is fed as a control difference to a field attenuation regulator 4. Said field attenuation regulator 4 can advantageously be implemented as an I or PI regulator, i.e. comprising integral and possibly proportional terms. The field attenuation regulator produces a target value id* for the magnetic field attenuation current as a control variable using the control difference.

Said target value is limited in the negative direction to a predetermined maximum value $id_{max}$ in the limiter 6. The determination of said maximum value for id* is carried out according to the revolution rate in module 18 using a characteristic field. In contrast to the first exemplary embodiment, a target value is not determined, but only a maximum value idmax is determined using a characteristic field. The predetermined characteristic field can be calculated using simulations and/or measured or verified in experiments. In the limiter 6, furthermore, the target value id* is limited in the positive direction to zero. It is thereby ensured that the current applied in the direction of the d-axis has a magnetic field attenuating effect.

The target value id*, which may be limited, is compared with the measured magnetic field attenuation current in the current regulator 3, wherein a target value ud for the voltage is generated in the direction of the d-axis as a control variable. The further modules, such as the limiter 7, the module 14 for determining the revolution rate and the modules 12 and for the Clarke and Park transformation of the measured currents through the phase windings operate as already described.

According to a preferred embodiment, the magnetic field attenuation current is limited so that a minimal current in the negative d-axis direction is also predetermined and is switched to the output of the field attenuation regulator 4. Said minimal current can advantageously also be determined according to the revolution rate using a characteristic field.

Figure 3:
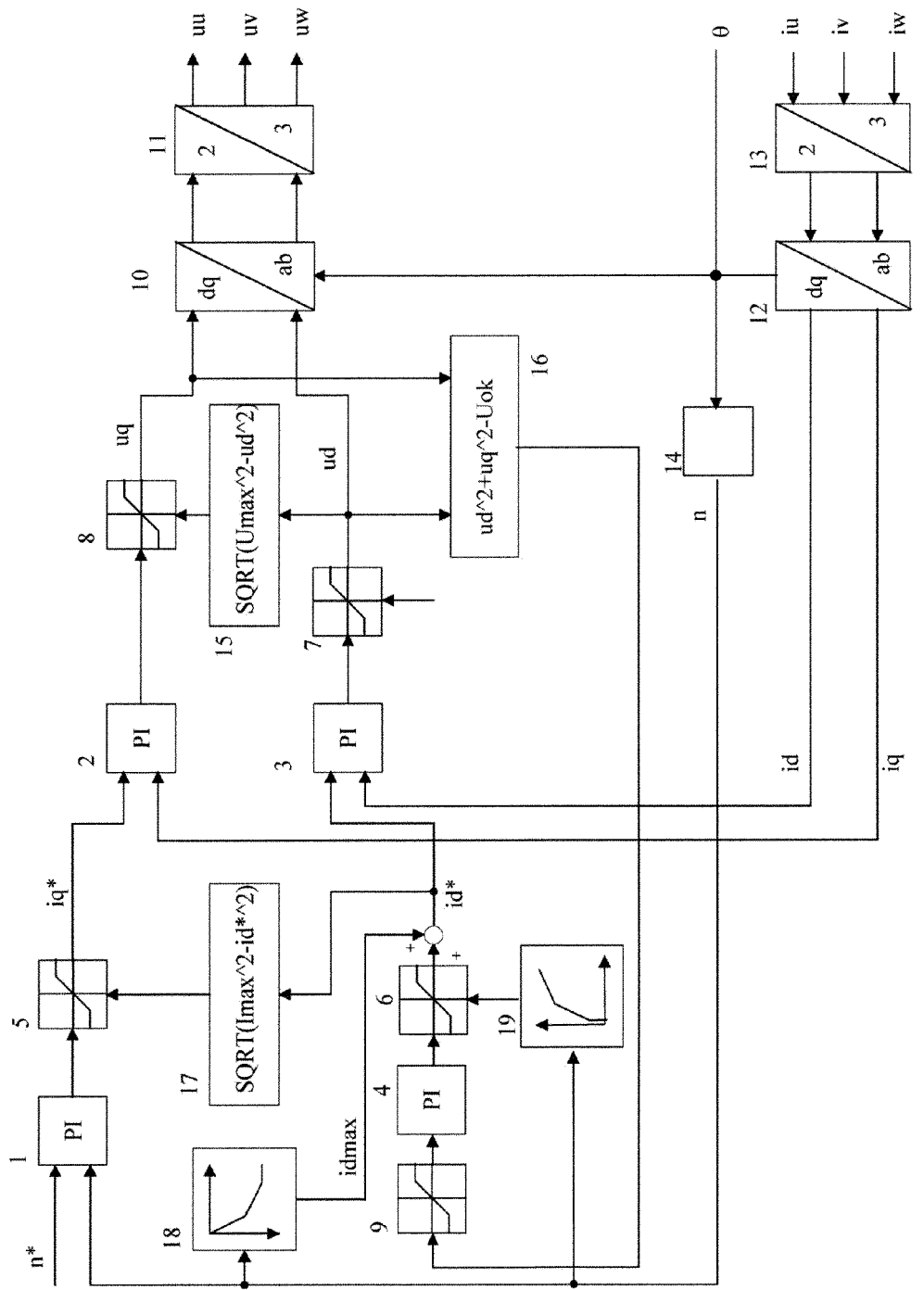
FIG. 3 shows a schematic representation of an actuation method or an actuation circuit according to a third exemplary embodiment of the invention.

FIG. 3 shows such an exemplary embodiment of the method according to the invention, which builds on the implementation according to FIG. 2. Modules that provide an identical function in this embodiment as in the first exemplary embodiment are provided with the same reference characters and we refer to the above implementations for a detailed description.

In order to increase the achievable system dynamics, advantageously the maximum permissible field attenuation current idmax is switched as a pre-control variable to the regulator output of the field attenuation regulator 4, which reduces the magnetic field attenuation current to the required value. It is advantageous if the pre-control variable is continuously reduced to zero after a predetermined time. When operating the motor in the field attenuation region, i.e. at high revolution rates with reduced torque, it can thereby be prevented that an unnecessarily large magnetic field attenuation current is imposed for a long time and that unnecessary current heat losses occur.

The output of said regulator can be limited depending on the revolution rate so that it is never less than zero and never greater than the difference between the maximum permissible magnetic field attenuation current id and the magnetic field attenuation current id that is at least necessary at a revolution rate. For this purpose, module 19 can provide values determined according to the revolution rate using a characteristic field to the limiter 6.

In the case of a dynamic target value request with the regulator having reached a steady state, the output value and the I-component of the regulator can be manipulated in a suitable manner. It can be provided to set the I-component of the regulator to a predetermined starting value according to the target value request.

By suitably adapted characteristic fields, particularly dynamic operation of the electronically commutated synchronous machine is thereby guaranteed, wherein control requests are thus implemented in a minimal time. Especially in hazardous situations, a rapid build-up of pressure can be ensured thereby.

Figure 4:
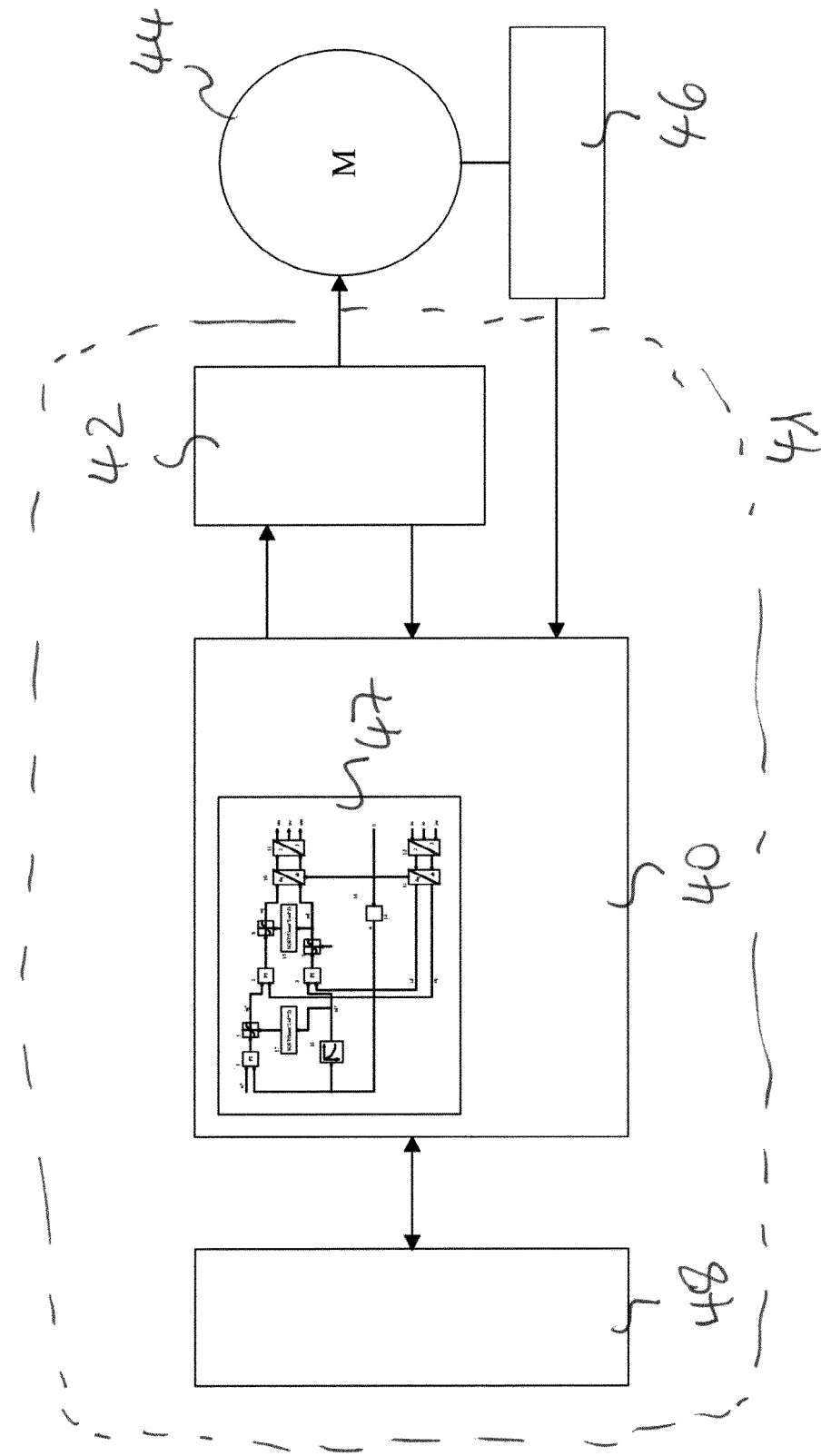
FIG. 4 shows the basic design an arrangement for operating a permanently energized synchronous machine.

FIG. 4 shows the schematic design of an arrangement for operating a permanently energized synchronous machine that can carry out a method according to the invention.

The actuation circuit 41 comprises a computation unit 40, a memory 48 and a bridge circuit or a power end stage 42. In particular, the computation unit 40 can be implemented as a microcontroller comprising an integrated working memory and a non-volatile program memory 47. A suitable microcontroller can also comprise a memory 48, which for example can be implemented as a flash memory. It is advantageous if the microcontroller comprises one or more analog-to-digital converters that are connected to measurement devices on power end stages or rotors. The power end stage can for example comprise sense FETs in order to enable a current measurement. It is also advantageous if means for voltage measurement are provided. In principle, external sensors can also be connected by means of a data bus. The permanently energized synchronous machine 44 comprises a stator with phase windings that are energized by the power end stage 42 and a rotor that is mechanically connected to the load, which is not shown. The position of the rotor is determined by a sensor 46, which for example is implemented as a resolver or an optical rotary encoder. It is further advantageous if sensors for the measurement of the temperature of phase windings, magnets or generally the surroundings are provided. In principle, the method according to the invention can also be implemented by a customer-specific circuit comprising specifically adapted components and in particular being integrated on a semiconducting substrate.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of operating a brake system for motor vehicles with an electrically controllable pressure supply device comprising:
   supplying brake pressure to a plurality of hydraulic wheel brakes from a hydraulic pressure chamber;
   displacing a piston within the hydraulic pressure chamber with an electromechanical actuator, wherein the electromechanical actuator comprises a rotation-translation gearbox and an electrical machine, wherein the electrical machine is an electronically commutated synchronous machine having a stator with at least two phase windings and a rotor comprising at least one permanent magnet as well as at least one rotor position sensor;
   regulating at least one of a torque-forming current and a magnetic field attenuation current in a coordinate system that is fixed relative to the rotor;
   transforming voltages in the coordinate system into control variables using a measured rotor position, wherein the control variables are a voltage vector that gives a voltage to be applied for each phase winding of the stator;
   determining a measured revolution rate of the rotor from a first predetermined characteristic field; and
   limiting a target for the magnetic field attenuation current to a maximum value according to the measured revolution rate and to not fall below a minimum value that is predetermined according to the measured revolution rate; and
   determining a target value for the magnetic field attenuation current according to the measured revolution rate of the rotor from the first predetermined characteristic field.

2. The method of claim 1, wherein there are three phase windings.

3. The method of claim 1, further comprising adapting the target value for the magnetic field attenuation current using a ratio between a reference voltage and a current supply voltage.

4. The method of claim 1, further comprising limiting a target value for the torque-forming current to a maximum value of the torque-forming current according to the measured revolution rate of the rotor.

5. The method of claim 4, wherein the target value for the magnetic field attenuation current and the maximum value of the torque-forming current are predetermined so that a predetermined limit value for a total current of the magnetic field attenuation current and the torque-forming current is not exceeded and that the torque of the electronically commutated synchronous machine is at a maximum while complying with the limit value for the total current.

6. The method of claim 1, wherein the limiting is carried out after the target value for the magnetic field attenuation current has been determined according to a difference between the magnitude of a predetermined maximum voltage, which corresponds to a current supply voltage minus a predetermined voltage interval, and the magnitude of a voltage vector formed by the torque-forming voltage and the magnetic field attenuation voltage, wherein the regulation of said difference is carried out.

7. The method of claim 6, wherein the regulation of the difference between the magnitude of a predetermined maximum voltage and the magnitude of a voltage vector formed from the torque-forming voltage and the magnetic field attenuation voltage is carried out when the magnitude of the voltage vector is less than a predetermined minimum value, wherein pre-control of the target value for the magnetic field attenuation current is carried out by predetermining the maximum permissible field attenuation current.

8. The method of claim 1, further comprising determining a target value for the torque-forming current according to a deviation between a target revolution Rate and the measured revolution rate of the rotor, and limiting the target value for the torque-forming current to a maximum value according to a target value for at least one of the magnetic field attenuation current, a maximum permissible total current, and a maximum permissible motor torque.

9. The method of claim 1, wherein a torque-forming voltage in the coordinate system that is fixed relative to the rotor is determined according to the difference between a target value for the torque-forming current and a measured torque-forming current, and limiting the torque-forming voltage according to a difference between the magnitude of a predetermined maximum voltage and the magnitude of a magnetic field attenuation voltage.

10. The method of claim 1, wherein the predetermined maximum voltage is a supply voltage.

11. The method of claim 1, wherein a magnetic field attenuation voltage in the coordinate system that is fixed relative to the rotor is determined according to the difference between a target value for the magnetic field attenuation current and a measured magnetic field attenuation current.

12. The method of claim 1, further comprising determining a measured torque-forming current and a measured magnetic field attenuation current in the coordinate system that is fixed relative to the rotor from measured currents through the phase windings of the rotor using the measured rotor position.

13. The method of claim 1, further comprising adapting the target value for the magnetic field attenuation current using at least one of a measured rotor temperature, a measured stator temperature, and a current supply voltage.

14. The method of claim 1, supplying the phase windings of the stator with current from a pulse width modulation circuit, wherein a voltage to be applied to a phase winding of the stator is converted into a degree of actuation of the corresponding pulse width modulation circuit.

15. The method of claim 14, further comprising adapting the degree of actuation according to a ratio of a reference voltage and a current supply voltage.

16. The method of claim 15, wherein the current supply voltage is a measured intermediate circuit voltage of the pulse width modulation circuit.

17. An electronic control unit for a brake system, comprising:
  an actuation circuit for an electronically commutated synchronous machine;
  a computation unit and semiconducting switch elements disposed in at least one pulse width circuit associated with each phase of a stator for the machine;
  wherein a maximum value for a magnetic field attenuation current is determined using pairs of values of measured revolution rates and associated maximum values read out from a non-volatile memory;
  wherein a measured revolution rate of the rotor is from a first predetermined characteristic field;
  wherein a target value for the magnetic field attenuation current is limited to a maximum value according to the measured revolution rate and is limited to not fall below a minimum value that is predetermined according to the measured revolution rate; and
  wherein the target value for the magnetic field attenuation current according to the measured revolution rate of the rotor from the first predetermined characteristic field.

18. The electronic control unit of claim 17, wherein the at least one bridge circuit is a pulse width modulation circuit associated with each phase of the stator.

19. A brake system comprising:
  an electrically controllable pressure supply circuit;
  a cylinder-piston arrangement with a hydraulic pressure chamber and a piston displaceable by an electromechanical actuator;
  a plurality of hydraulic wheel brakes that are associated with at least one axle of the vehicle and that can be supplied with brake pressure by the hydraulic pressure chamber;
  a sensor for detecting braking intention;
  wherein the electromechanical actuator comprises a rotation-translation gearbox and an electronically commutated synchronous machine comprising:
  a stator with at least two phase windings;
  a rotor comprising at least one permanent magnet;
  at least one rotor position sensor; and
  an electronic control unit comprising:
    an actuation circuit for the electronically commutated synchronous machine;
    a computation unit and semiconducting switch elements disposed in at least one pulse width modulation circuit associated with each phase of the stator; and
    wherein a maximum value for a magnetic field attenuation current is determined using pairs of values of measured revolution rates and associated maximum values read out from a non-volatile memory; and
  wherein a measured revolution rate of the rotor is from a first predetermined characteristic field;
  wherein a target value for the magnetic field attenuation current is limited to a maximum value according to the measured revolution rate and is limited to not fall below a minimum value that is predetermined according to the measured revolution rate; and
  wherein the target value for the magnetic field attenuation current according to the measured revolution rate of the rotor from the first predetermined characteristic field.

20. The brake system as of claim 19, wherein an electrical drive connected to at least one wheel of the motor vehicle, is actuated so that said drive produces a braking deceleration of the vehicle.

* * * * *